US012594847B2

(12) United States Patent
Djedovic et al.

(10) Patent No.: US 12,594,847 B2
(45) Date of Patent: Apr. 7, 2026

(54) ELECTROMOTIVE LOCKING UNIT FOR AN ELECTRICAL CHARGING DEVICE OF A MOTOR VEHICLE

(71) Applicant: Kiekert AG, Heiligenhaus (DE)

(72) Inventors: Benjamin Djedovic, Oberhausen (DE); Tim Sonnenschein, Wuppertal (DE)

(73) Assignee: Kiekert AG, Heiligenhaus (DE)

( * ) Notice: Subject to any disclaimer, the term of this patent is extended or adjusted under 35 U.S.C. 154(b) by 423 days.

(21) Appl. No.: 18/253,281

(22) PCT Filed: Dec. 2, 2021

(86) PCT No.: PCT/DE2021/100961
§ 371 (c)(1),
(2) Date: May 17, 2023

(87) PCT Pub. No.: WO2022/117155
PCT Pub. Date: Jun. 9, 2022

(65) Prior Publication Data
US 2024/0001782 A1 Jan. 4, 2024

(30) Foreign Application Priority Data

Dec. 2, 2020 (DE) ..................... 10 2020 132 026.4

(51) Int. Cl.
B60L 53/00 (2019.01)
B60L 53/16 (2019.01)
B60L 53/18 (2019.01)

(52) U.S. Cl.
CPC .............. B60L 53/16 (2019.02); B60L 53/18 (2019.02); B60L 2270/32 (2013.01)

(58) Field of Classification Search
CPC ....... B60L 53/16; B60L 53/18; B60L 2270/32
USPC ................................................... 296/37, 37.1
See application file for complete search history.

(56) References Cited

U.S. PATENT DOCUMENTS

2011/0201223 A1 8/2011 Kurumizawa et al.
2015/0249307 A1 9/2015 Natter et al.

FOREIGN PATENT DOCUMENTS

| CN | 102687348 A | 9/2012 |
| CN | 103038083 A | 4/2013 |
| CN | 111386636 A | 7/2020 |
| DE | 102012022413 B3 | 2/2014 |
| DE | 102013008550 A1 | 11/2014 |
| DE | 102015108831 A1 | 12/2016 |
| EP | 2803794 A2 | 11/2014 |

(Continued)

OTHER PUBLICATIONS

International Search Report mailed Mar. 14, 2022, for priority International Application No. PCT/DE2021/100961.

*Primary Examiner* — Steven O Douglas
(74) *Attorney, Agent, or Firm* — Renner, Otto, Boisselle & Sklar, LLP

(57) ABSTRACT

An electromotive locking unit for an electrical charging device of a motor vehicle, in particular an electric or hybrid motor vehicle. The locking unit is equipped with an electric motor and a transmission connected downstream thereof and furthermore with a locking element, which can be linearly applied by the transmission, for detachably locking a charging plug in a charging socket of the electrical charging device. In addition, at least one stop for the locking element is provided. According to the invention, the stop for the locking element is designed as an elastic end stop buffer which is held in a recess of the locking element.

15 Claims, 3 Drawing Sheets

(56) References Cited

FOREIGN PATENT DOCUMENTS

| EP | 2668062 | B1 | 11/2020 |
| WO | 2010149426 | A1 | 12/2010 |
| WO | 2020108694 | A1 | 6/2020 |

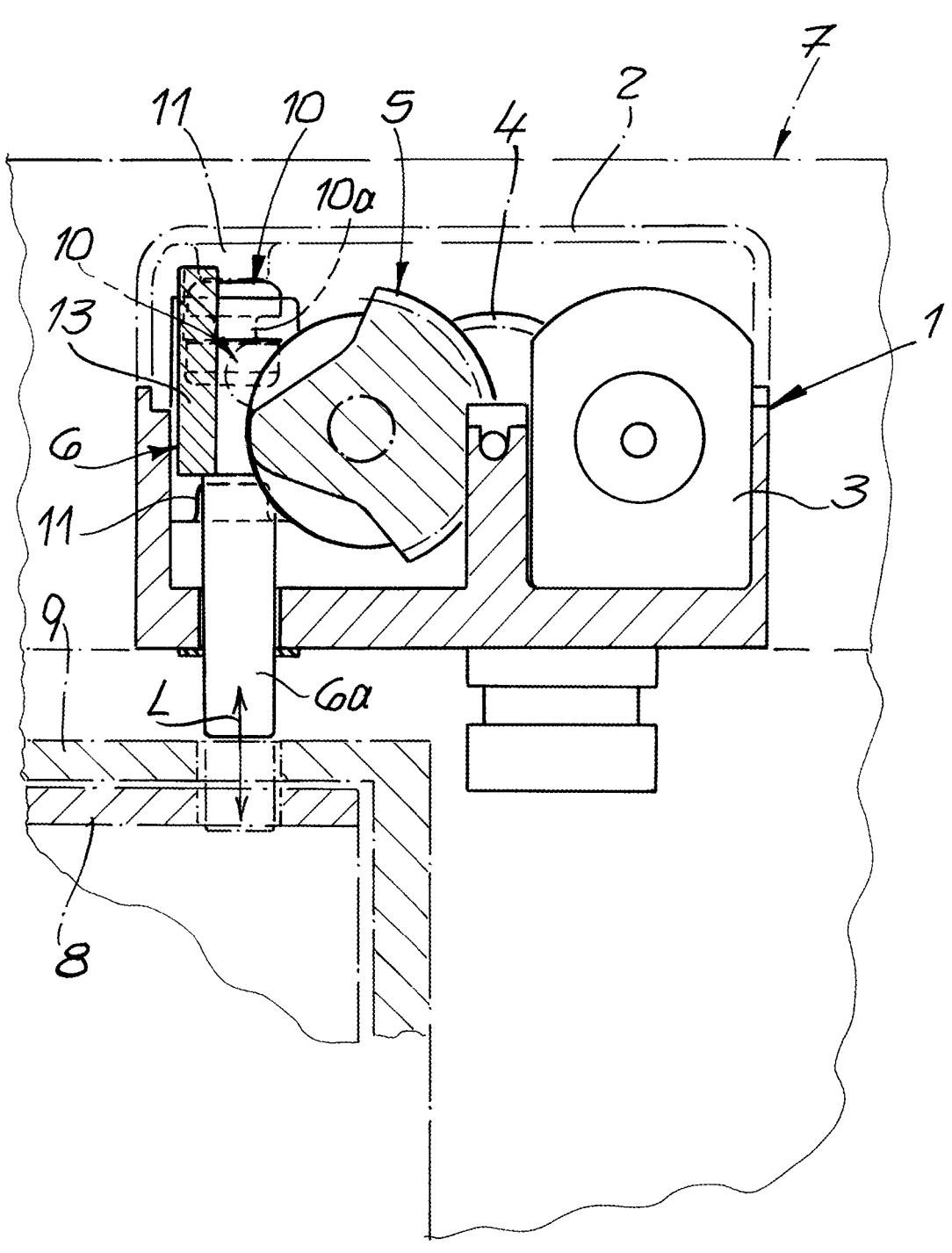
_Fig.1_

ELECTROMOTIVE LOCKING UNIT FOR AN ELECTRICAL CHARGING DEVICE OF A MOTOR VEHICLE

This application is a national phase of International Patent Application No. PCT/DE2021/100961 filed Dec. 2, 2021, which claims priority to German Patent Application No. 10 2020 132 026.4 filed Dec. 2, 2020, each of which is hereby incorporated herein by reference in its entirety.

FIELD OF DISCLOSURE

The invention relates to an electromotive locking unit for an electrical charging device of a motor vehicle, in particular an electric or hybrid motor vehicle, having an electric motor and a transmission connected downstream thereof and furthermore having a locking element, which can be linearly applied by the transmission, for detachably locking a charging plug in a charging socket of the electrical charging device, and having at least one stop for the locking element.

BACKGROUND OF DISCLOSURE

Electrical charging devices in motor vehicles and in particular electric or hybrid motor vehicles are used to supply the one or more batteries present in the interior of the motor vehicle with electric energy. For this purpose, a charging infrastructure is generally used, which typically includes charging columns equipped with a charging plug connected to an extension cable. For the charging process with electric energy, the charging plug of the charging column is generally coupled to the charging socket on the motor vehicle side and detachably locked. This is ensured by the electromotively movable locking element.

A locking is necessary in order to avoid health hazards, for example, since high voltage is generally in use at this location. The locking also ensures that only previously identified users legitimately draw the electric energy provided by the charging column and misuse is prevented. For this purpose, an identification of the operator and an authorization check by means of an identification signal are usually carried out before such a charging process. This is described by way of example and in principle in WO 2010/149426 A1.

The adjustment of the locking element is carried out in the prior art according to CN 2020695855 U by means of an electromotive drive which is composed of an electric motor and a multi-stage transmission connected downstream thereof. In the known teaching, the locking element can be linearly applied by the multi-stage transmission operating via a cam.

DE 10 2013 008 550 A1 relates to an electromechanical locking unit for vehicles. It has, among other things, a mechanical stop assigned to the locking mechanism, which blocks its movement at a defined end position. For this purpose, the stop has an elastic element which is arranged such that it is mechanically deformed before reaching the defined end position. In this way, the movement of a moving element, in particular of the locking element, is delayed.

In the context of the generic teaching according to DE 10 2012 022 413 B3, a locking device for locking an electrical plug in a socket is described. The locking device in question can in this case also be used in connection with an electrical charging device in electric or hybrid motor vehicles. A locking bolt realized at this point is equipped with stops which interact with driver stops on a driver element. The driver stops or driver counter-stops are obviously not elastic, so that the known locking bolt moves against hard end stops.

SUMMARY OF DISCLOSURE

The technical problem addressed by the invention is that of developing such an electromotive locking unit for an electrical charging device of a motor vehicle such that a perfect functionality is present and in particular damage to the locking element in the region of its stops is reliably prevented.

For solving this technical problem, a generic electromotive locking unit within the scope of the invention is characterized in that the stop for the locking element is designed as an elastic end stop buffer which is held in a recess of the locking element.

According to the invention, a special stop is therefore used as a stop for the locking element, namely an elastic end stop buffer which, due to its elasticity, inherently absorbs and damps voltage peaks when the stop or end stop for the locking element is approached. Due to the additional attachment of the end stop buffer in a recess of the locking element, the end stop buffer can moreover be equipped with a significant size sufficient for the desired functionality and thus with a damping effect. Furthermore, the attachment of the end stop buffer in the recess of the locking element opens up the further advantage that the overall height in a housing accommodating the electromotive locking unit can be kept low as a result or is not negatively influenced by the provided end stop buffer.

This contributes additionally to the fact that the recess is typically connected to the locking element via a cantilever, preferably on the head side. As a result, the recess can be placed practically "next to" the locking element, for example, in a free region which is already observed in the interior of the housing for receiving the electromotive locking unit. This facilitates a compact design and also offers the possibility of realizing the end stop buffer expansively and in the desired size in order to provide a significant damping path in the region of the end stop of the locking element. This contributes additionally to the fact that the end stop buffer is generally made from an elastomer, i.e., an elastomeric plastic.

At this point, typical elastomers can be used such as, for example, acrylate rubber (ACM), acrylonitrile butadiene rubber (NBR), ethylene propylene rubber (EPDM), natural rubber (NR), styrene butadiene rubber (SBR), to name only individual suitable elastomers or elastomeric plastics by way of example.

Since the locking element is typically also made from a (thermoplastic) plastic and the recess, including the cantilevers, together with the locking element generally defines a one-piece component, the locking element or the recess and the end stop buffer accommodated in the recess can basically be produced as a one-piece component. For this purpose, the end stop buffer made from the elastomeric plastic may be formed on the, for example, thermoplastic material of the recess or can be produced together with the end stop buffer in a two-component injection molding process.

In general, however, the locking element, including the recess and the cantilever, is a separate (thermoplastic) component made from plastic, which is detachably coupled to the end stop buffer which is separate therefrom and made from the elastomer or the elastomeric plastic. For this purpose, the procedure is usually such that the end stop buffer is detachably connected to a web in the recess. In this case, the web can divide the recess approximately in half. In most cases, a horizontal division of the recess is observed here. In addition, the web regularly has a receiving slot. In this case, the receiving slot is usually designed to taper in the mounting direction of the end stop buffer. In most cases, a V-shaped tapering receiving slot is observed here.

Since the locking element, moving back and forth in a linear manner, generally moves at the end of each travel path against two end stops or counter-stops, advantageously two end stop buffers, opposite one another with regard to the web, are realized. The two end stop buffers interact with a counter-stop in a housing and with a further counter-stop in a cover for the housing, respectively.

In this case, the overall design is such that the electromotive locking unit is accommodated overall in the housing, wherein the housing is closed on the head side by means of the cover. As a result, the electromotive locking unit can practically define a component of the electrical charging device as the same unit or module. In fact, this is a main component. In this case, the design is additionally selected such that the locking element, which is retractable and extendable relative to the housing, can more or less protrude through a seal from the housing in question and be retracted again.

The two end stop buffers are generally designed to be identical and usually have an annular characteristic, comparable to a "donut." In addition, the two end stop buffers are regularly coupled to one another by means of a connecting web. In this case, the connecting web generally engages in the receiving slot of the web which divides the recess approximately in half.

By means of the annular shape of the end stop buffer with a central recess, adjoined by the connecting web coupling the two end stop buffers, a particularly favorable damping behavior is observed, which is also able to absorb large damping paths. This is because the annular characteristic of the end stop buffer does not only allow an intramolecular deformation of the end stop buffer made from the elastomer, but the end stop buffer can practically also deform spatially or macromolecularly or with respect to its external shape, for example, it can be almost "flattened." This is because the central recess of the annular accommodates material diverted into the recess when the end stop buffer is compressed.

In any case, an electromotive locking unit for an electrical charging device of a motor vehicle is overall provided, which offers both functional and acoustic advantages. This is because, due to the special end stop buffer, the locking element is prevented from moving "hard" against the respective counter-stop interacting with the end stop buffer in the housing or in the cover at the end of its travel path. Instead, the interposed end stop buffer ensures a soft impact at the end of the travel path and, as a result, voltage peaks possibly introduced into the material (made from plastic) are prevented. This significantly increases the service life and functionality of the locking element.

In addition, the soft approach in the region of the respective counter-stops is optimized acoustically and it was thus possible to reduce the noise generation to a minimum when compared to the prior art. Finally, the attachment of the end stop buffer in the recess via the cantilever ensures that the overall height of the locking element is not increased overall; instead, the recess together with the end stop buffer is accommodated practically "next to" the locking element in a hollow space of the housing. As a result, the compact structure of the electromotive locking unit according to the invention is overall not negatively influenced when compared to previous embodiments. Herein lie the essential advantages.

BRIEF DESCRIPTION OF DRAWINGS

The invention is explained in greater detail below with reference to a drawing which shows only one exemplary embodiment. In the drawing:

FIG. 1 schematically shows the electromotive locking unit according to the invention together with the electrical charging device;

DETAILED DESCRIPTION

Figure 2:
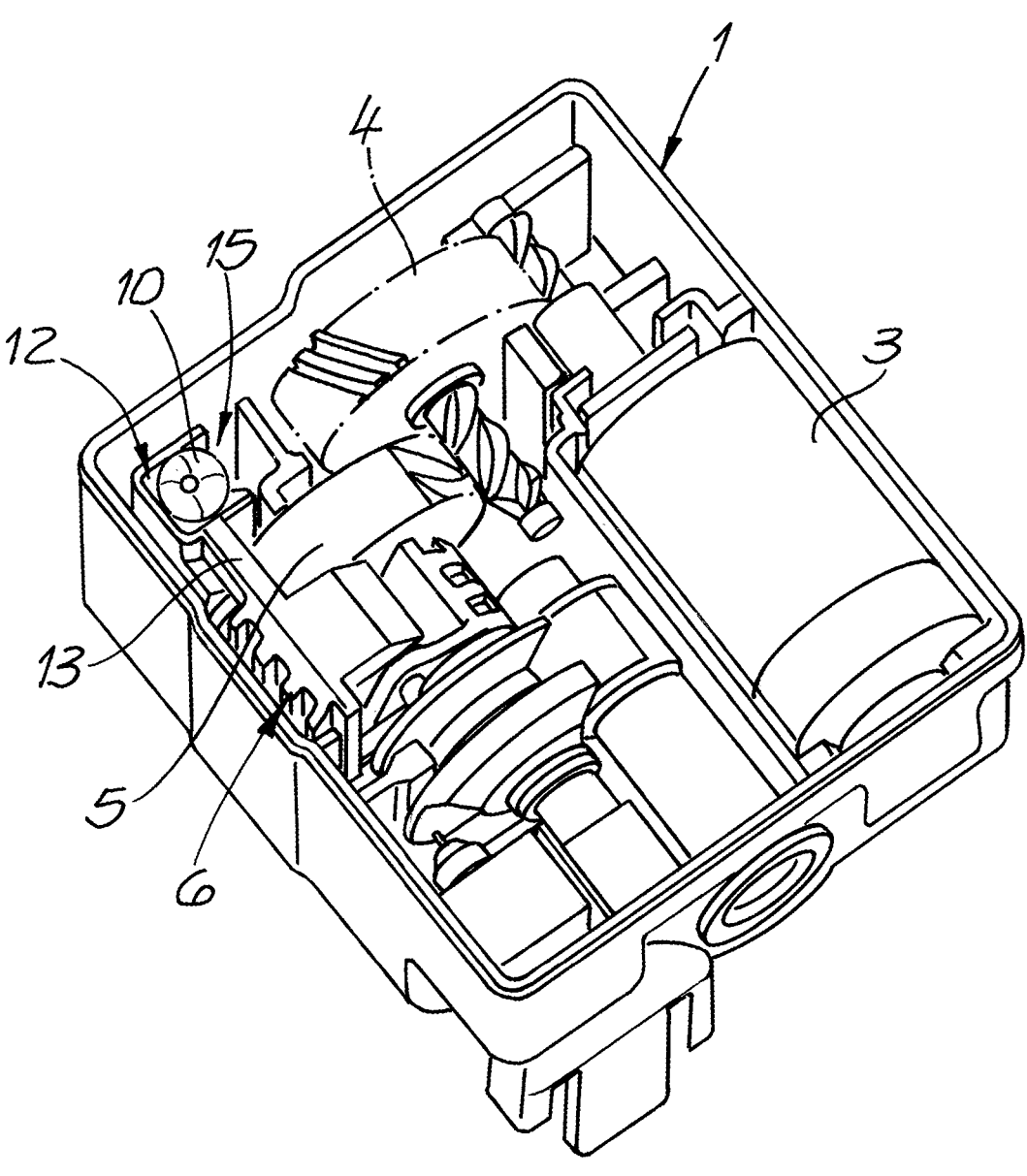
FIG. 2 shows the electromotive locking unit in a general overview.

FIG. 1 shows an electromotive locking unit for an electrical charging device of a motor vehicle. For this purpose, the electromotive locking unit is accommodated in a housing 1 which, in the open state, is the subject matter of FIG. 2. The housing 1 is closed, in most cases hermetically sealed, with a cover 2, not expressly shown in FIG. 2. An electric motor 3, which operates on a transmission 4, 5 connected downstream thereof, can be seen in the interior of the housing 1.

The transmission 4, 5 is composed essentially of a gear-wheel 4 meshing with a worm on the output shaft of the electric motor 3 and a crank wheel 5 which interacts with a locking element 6. For this purpose, the crank wheel 5 engages with a crank pin in a corresponding pin seat of the locking element 6 and in this way ensures that the locking element 6 can carry out linear movements, shown understandably in particular in FIG. 1, in the linear direction L indicated therein. Instead of the crank wheel 5 of the exemplary embodiment presented, other output elements, for example, a toothed rack, could also be used.

For this purpose, the locking element 6 more or less emerges from the housing 1 in the region of a depicted recess, wherein the recess is closed by means of a seal which is penetrated by the locking element 6. According to the exemplary embodiment in FIG. 1, the locking element 6 moves into a recess of a charging module 7, so that in this way a charging plug 8 of the initially already described charging column infrastructure can be detachably locked with a motor-vehicle-side charging socket 9. In this case, the charging module 7 and the charging socket 9 together with the electromotive locking unit or the housing 1, including the cover 2 and the locking element 6 movable in relation thereto, overall define an electrical charging device 1, 2, 6; 7, 9. In this case, the electromotive locking unit or the locking actuator, realized in this way, with the housing 1, including the cover 2 and the locking element 6 movable in relation thereto, represents the main component of the electrical charging device 1, 2, 6; 7, 9.

FIG. 2 shows the internal structure of the electromotive locking unit in the interior of the housing 1 with the cover 2 removed. By means of the locking element 6, which can be moved in the linear direction L according to the depiction in FIG. 1, the charging plug 8 can be detachably locked in the charging socket 9 of the electrical charging device 1, 2, 6; 7, 9, as stated. Furthermore, a stop 10 assigned to the locking element 6 can also be seen. The stop 10 of the locking element 6 interacts in each case at the end of the travel path of the locking element 6 in the linear direction L with an associated counter-stop 11.

Figure 3:
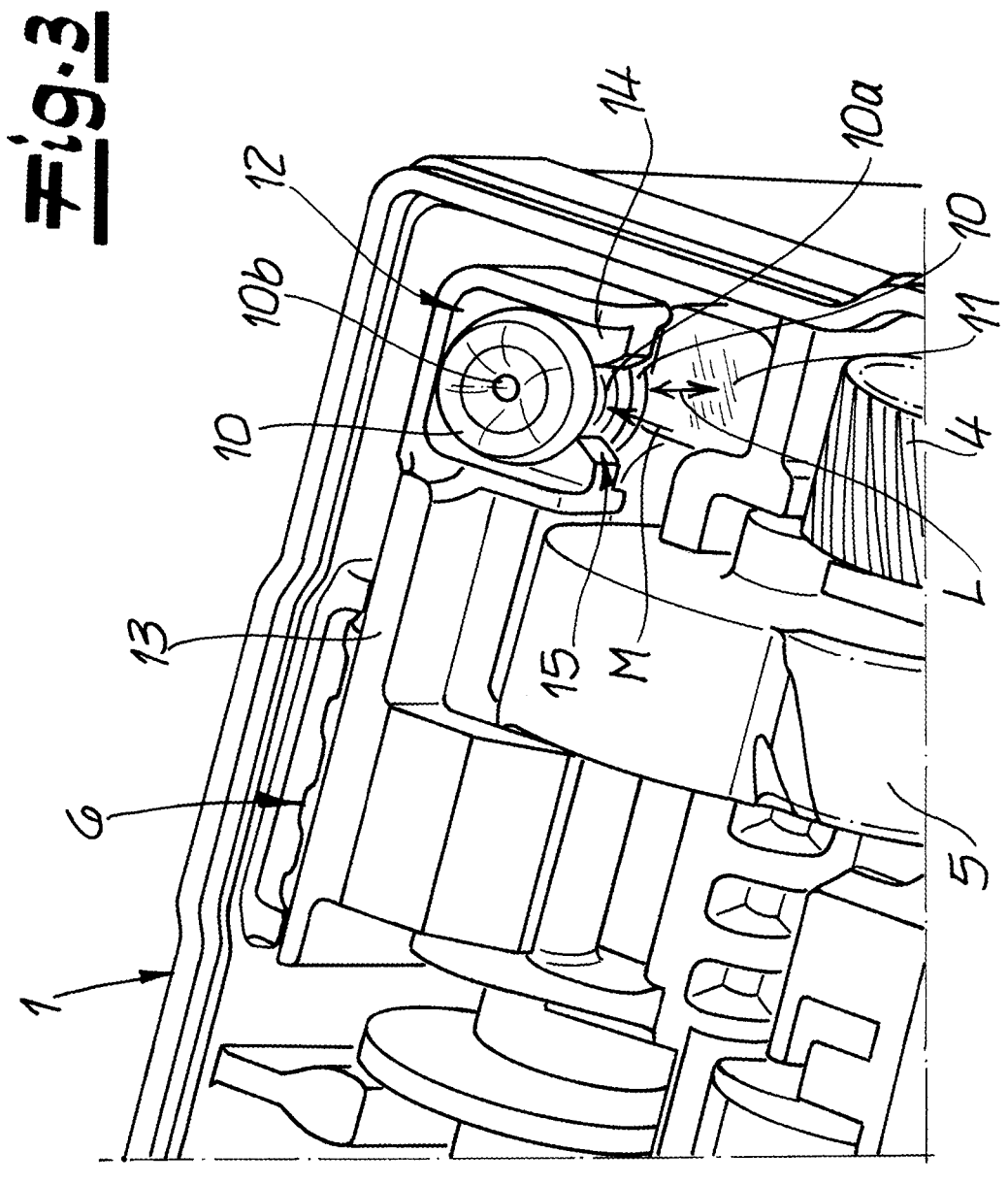
FIG. 3 shows a detail from FIG. 2 in the region of the locking element.

It can be seen from the detailed depiction in FIG. 3 that a counter-stop 11 is provided in the interior of the housing 1. By contrast, another counter-stop 11 is located in the interior of the cover 2 and is indicated in FIG. 1. In any case, the locking element 6 with its stop 10 can be moved back and forth between the two counter-stops 11 in the linear direction L. As a result, the travel path of the locking element 6 is predetermined and delimited.

It can be seen in particular in the detailed depiction in FIG. 3 that, according to the invention, the stop 10 assigned to the locking element 6 is designed as an elastic end stop buffer 10 which is held in a recess 12 of the locking element 6. In fact, the recess 12 is connected to the locking element 6 via a cantilever 13. In other words, the recess 12, together with the locking element 6, also moves in the linear direction L, as is indicated in FIG. 3, but it is spaced apart from a pin-shaped extension 6a of the locking element 6, which ultimately ensures the detachable locking of the charging plug 8 in the charging socket 9.

As a result, the recess 12 accommodating the end stop buffer 10 on the locking element 6 finds space in the interior of the housing 1, specifically in a hollow space which is defined and predetermined by the gearwheel 4 and also by the crank wheel 5. As a result, its movement in the linear direction L is delimited by means of the end stop buffer 10 of the locking element 6 and the housing 1 does not have an increased overall height. Furthermore, it can be seen that in the example case, the locking element 6 including the cantilever 13 and the recess 12 overall define a one-piece component made from a thermoplastic material. According to the exemplary embodiment, the stop buffer 10 is a separate component made from an elastomeric plastic.

For installing the end stop buffer 10, it is detachably connected to a web 14 in the recess 12. In this context, the web 14 ensures that the recess 12, U-shaped in plan view, is divided approximately in half. Furthermore, the web 14 is equipped with a receiving slot 15 which tapers in a mounting direction M of the end stop buffer 10. In this case, the receiving slot 15 is designed to taper in a V-shaped manner in the mounting direction M in question.

Furthermore, it can be seen that two end stop buffers 10, opposite one another with regard to the largely horizontally extending web 14, are realized. The two end stop buffers 10 interact with the counter-stop 11 in the housing 1 and also with the further counter-stop 11, indicated in FIG. 1, in the cover 2 for the housing 1.

The two end stop buffers 10 are overall designed to be identical and engage in the receiving slot 15 of the web 14 by means of a connecting web 10a coupling said end stop buffers. The connecting web 10a between the two end stop buffers 10 extends in each case starting from a recess 10b in the associated end stop buffer 10. In fact, the respective end stop buffer 10 according to the exemplary embodiment is designed to be annular in the form of a "donut." In its center, this results in the previously mentioned recess 10b which continues into the connecting web 10a to the further second end stop buffer 10. The recess 10b allows for large damping paths of the end stop buffer 10 because it can deflect into the recess 10b during its deformation and can thus be virtually "flattened."

| List of reference signs | | | |
|---|---|---|---|
| 1, 2, 6; 7, 9 | Electromotive locking unit for an electrical charging device | | |
| 1 | Housing | | |
| 2 | Cover | | |
| 3 | Electric motor | | |
| 4, 5 | Transmission | | |
| 4 | Gearwheel | | |
| 5 | Crank wheel | | |
| 6 | Locking element | 6a | Extension |
| 7 | Charging module | | |
| 8 | Charging plug | | |
| 9 | Charging socket | | |
| 10 | Stop/End stop buffer | 10a | Connecting web |
| | | 10b | Recess |
| 11 | Counter-stop | | |
| 12 | Recess | | |
| 13 | Cantilever | | |
| 14 | Web | | |
| 15 | Receiving slot | | |
| L | Linear direction | | |

The invention claimed is:

1. An electromotive locking unit for an electrical charging device of a motor vehicle, the electromotive locking unit comprising:
    an electric motor and a transmission connected downstream from the electronic motor,
    a locking element that is linearly applied by the transmission for detachably locking a charging plug in a charging socket of the electrical charging device, and
    at least one stop for the locking element, wherein the stop is an elastic end stop buffer which is held in a recess of the locking element,
    wherein the end stop buffer is detachably connected to a web in the recess.

2. The locking unit according to claim 1, wherein the web divides the recess approximately in half horizontally.

3. The locking unit according to claim 1, wherein the web has a receiving slot which tapers in a mounting direction of the end stop buffer.

4. The locking unit according to claim 3, wherein the receiving slot tapers in a V-shaped manner.

5. The locking unit according to claim 1, comprising two end stop buffers opposite one another with regard to the web.

6. The locking unit according to claim 5, further comprising a housing and a cover for the housing, wherein the two end stop buffers interact with a counter-stop in the housing and a further counter-stop in the cover for the housing, respectively.

7. The locking unit according to claim 5, wherein the two end stop buffers are identical and engage in the receiving slot of the web by a connecting web.

8. The locking unit according to claim 1, wherein the recess is connected to the locking element via a cantilever.

9. The locking unit according to claim 1, wherein the end stop buffer is an elastomer.

10. The locking unit according to claim 8, wherein the recess is connected to the locking element via the cantilever on a head side of the locking element.

11. The locking unit according to claim 8, wherein locking element, the cantilever, and the recess overall are a one-piece component made from a thermoplastic material.

12. The locking unit according to claim 7, wherein the two end stop buffers have an annular configuration coupled to each other by the connecting web.

13. An electromotive locking unit for an electrical charging device of a motor vehicle, the electromotive locking unit comprising:

an electric motor and a transmission connected downstream from the electronic motor, a locking element that is linearly applied by the transmission for detachably locking a charging plug in a charging socket of the electrical charging device, and at least one stop for the locking element, wherein the stop is an elastic end stop buffer which is held in a recess of the locking element, wherein the recess is connected to the locking element via a cantilever.

14. The locking unit according to claim 13, wherein the recess is connected to the locking element via the cantilever on a head side of the locking element.

15. The locking unit according to claim 13, wherein locking element, the cantilever, and the recess overall are a one-piece component made from a thermoplastic material.

\* \* \* \* \*